United States Patent [19]

Sakurai

[11] 4,451,105
[45] May 29, 1984

[54] ELECTRICAL CONNECTOR DEVICE

[75] Inventor: Yoshimi Sakurai, Tokyo, Japan

[73] Assignee: Honda Giken Kogyo Kabushiki Kaisha, Tokyo, Japan

[21] Appl. No.: 347,799

[22] Filed: Feb. 11, 1982

[30] Foreign Application Priority Data

Feb. 13, 1981 [JP] Japan .................................. 56-20338

[51] Int. Cl.³ .......................................... H01R 39/02
[52] U.S. Cl. .................................. 339/113 R; 339/3 R
[58] Field of Search ............... 339/3 R, 3 S, 5 R, 2 L, 339/113 R

[56] References Cited

U.S. PATENT DOCUMENTS

| | | | |
|---|---|---|---|
| 2,999,596 | 8/1960 | Levene | 339/2 L |
| 3,525,536 | 8/1970 | Pruneski | 339/3 S |
| 3,763,455 | 10/1973 | Confer et al. | 339/3 S |

*Primary Examiner*—Eugene F. Desmond
*Attorney, Agent, or Firm*—Irving M. Weiner; Pamela S. Burt; John L. Shortley

[57] ABSTRACT

An electrical connector device for use in an electrical system requiring electrical connection between rotatable members. The device comprises a first insulator having at least one first terminal affixed thereto, a first shaft member projecting from the first insulator, a second insulator rotatably fitted over the first shaft member and having at least one second terminal affixed thereto, a second shaft member secured to the second insulator, a flexible conductor in the form of a wire having either end connected to the first and second terminals, the conductor being wound around the first shaft member, and a restriction mechanism for limiting relative rotation between the first and second insulators within a predetermined angle. The restriction mechanism includes a first gear of a relatively large diameter fitted over the first shaft member for angular movement therewith and a second gear of a relatively small diameter held in meshing engagement with the first gear for angular movement about the second shaft member. The first and second insulators can easily and precisely be positioned with respect to each other.

7 Claims, 9 Drawing Figures

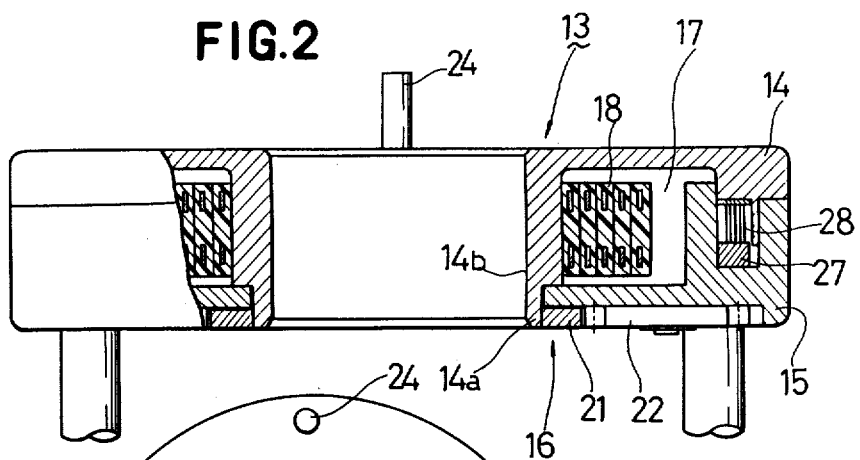
FIG.2
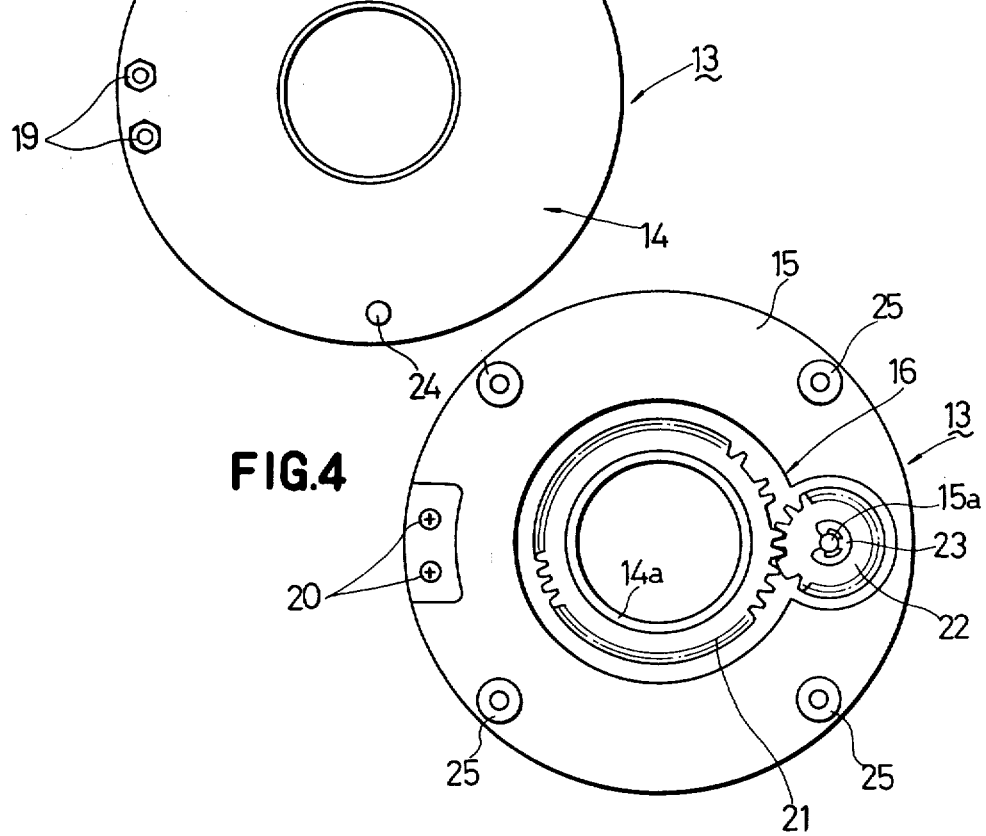
FIG.3
FIG.4

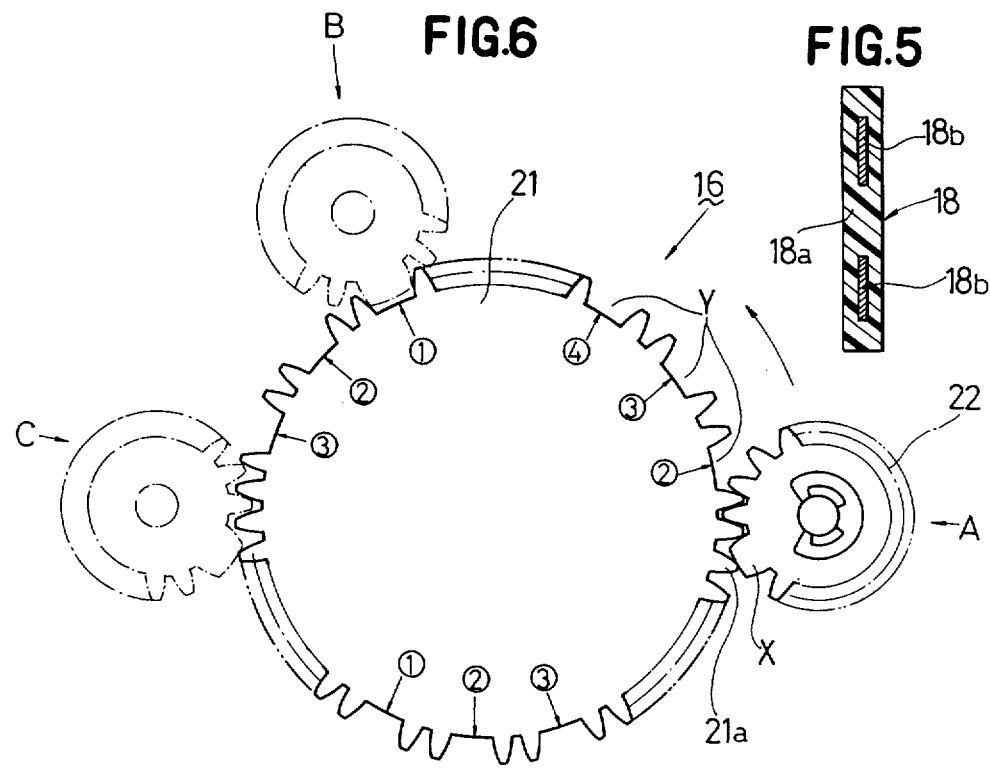
FIG.6
FIG.5
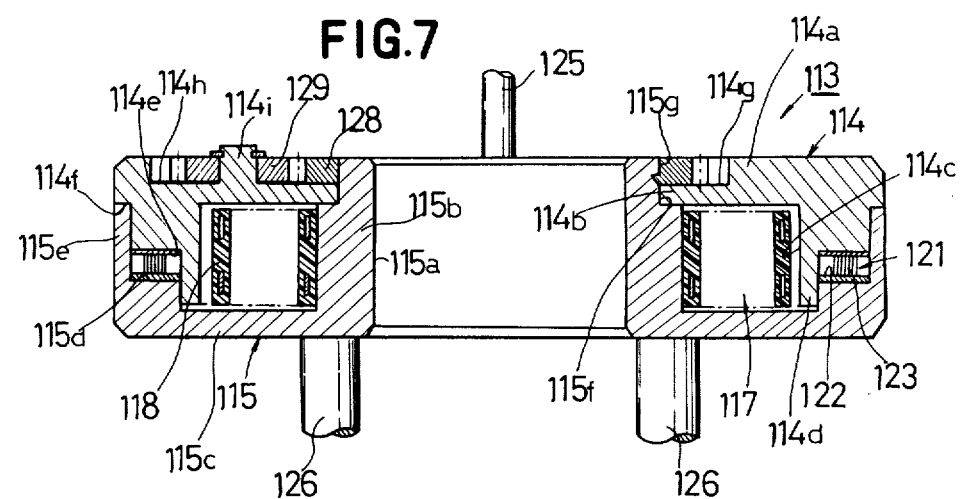
FIG.7

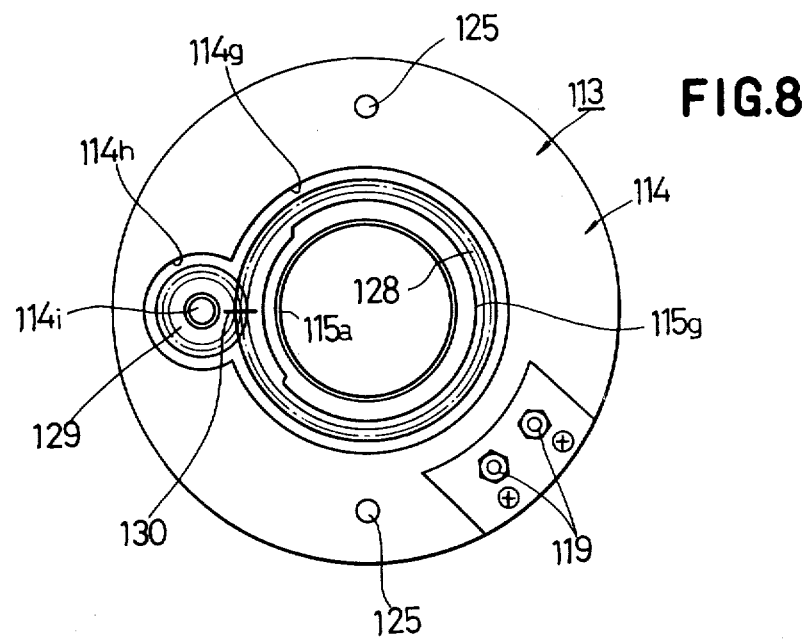
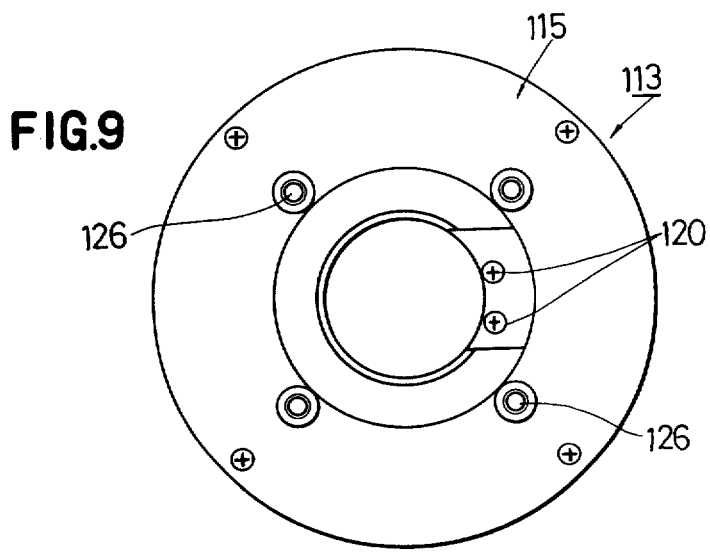

ELECTRICAL CONNECTOR DEVICE

BACKGROUND OF THE INVENTION

1. Field of the Invention

The present invention relates generally to an electrical connector device, and more particularly to an electrical connector device for use in an electrical system requiring electrical connection between rotatable members, such as an electrical system for an air bag system mounted in the steering wheel of a motor vehicle.

2. Description of Relevant Art

There have been known air bag systems which include an air bag normally folded in a collapsed condition within either the steering wheel of a motor vehicle or other parts thereof, and inflatable to provide cushioning against harmful impacts to which occupants of the motor vehicle would otherwise be subjected in an automobile accident. Such air bag systems include a collision sensor which, upon detection of a collision which demands air bag inflation, delivers an electric signal to an actuator for igniting an explosive in order to release or produce a pressurized gas which, together with air, is to be introduced into the air bag to distend same.

The air bag in its collapsed condition is normally housed in the steering wheel with the actuator and gas generator disposed adjacent to the air bag, while the collision sensor is disposed at a fixed position remote from the air bag. Because the steering wheel must be rotatable, the collision sensor and the actuator are required to be electrically connected to each other by a suitable electrical connector which permits electrical connection at all times between mutually rotatable members connected respectively to the collision sensor and the actuator.

Various rotatable electrical connectors have been devised for use with air bag systems, which electrical connectors must be absolutely reliable and stable in operation. One such known electrical connector comprises a slip ring mechanism including a slip ring and a brush which are movable relative to each other and held in sliding contact with each other.

To overcome various problems attendant known slip ring mechanisms, the present applicant has proposed an electrical connector device comprising an electrical conductor as a loose connection wire between casings, as disclosed in Japanese Patent Application No. 55-140244, filed Oct. 7, 1980. One of the casings is coupled to a rotatable member such as a steering wheel and the other casing is coupled to a fixed member such as a steering column. When the rotatable member rotates, the electrical conductor becomes progressively wound or unwound while maintaining electrical connection between the rotatable and fixed members. Where the electrical conductor is assembled out of neutral position, i.e., if the conductor has either end thereof fixed to be angularly displaced in either a winding or an unwinding direction when the steering wheel is not rotated, due to an error occurring when the electrical conductor is assembled or serviced, the conductor will be short of its winding or unwinding capacity when the steering wheel is rotated clockwise or counterclockwise. Consequently, the conductor will be subjected to undue tension, and the steering wheel will become sluggish in the turning motion thereof. Assembly operation for such a connector device is tedious and complex because the conductor requires checking to determine whether it is properly assembled in the neutral position.

Accordingly, there has developed a desideratum for an improved electrical connector which permits a smoother and simplified assembly procedure.

The present invention overcomes the foregoing shortcomings and disadvantages attendant conventional electrical connectors, and at the same time eminently fulfills the aforesaid desideratum.

SUMMARY OF THE INVENTION

The present invention provides an electrical connector device comprising a first insulator having at least one first terminal affixed thereto, a first shaft member projecting from the first insulator, a second insulator rotatably fitted over the first shaft member and having at least one second terminal affixed thereto, and a second shaft member secured to the second insulator. A flexible conductor is provided in the form of a wire having either end thereof connected to the first and second terminals, the conductor being wound around the first shaft member. A restriction mechanism is provided for limiting relative rotation between the first and second insulators within a predetermined angle, the restriction mechanism including a first gear of a relatively large diameter fitted over the first shaft member for angular movement therewith and a second gear of a relatively small diameter held in meshing engagement with the first gear for angular movement about the second shaft member.

There is also provided in accordance with the invention an electrical connector device comprising a first insulator having at least one first terminal affixed thereto, a first shaft member projecting from the first insulator, a second insulator rotatably fitted over the first shaft member and having at least one second terminal affixed thereto, and a second shaft member secured to the second insulator. A flexible conductor is provided in the form of a wire having either end thereof connected to the first and second terminals, the conductor being wound around the first shaft member. A first gear of a relatively large diameter is fitted over the first shaft member for angular movement therewith, a second gear of a relatively small diameter is held in meshing engagement with the first gear for angular movement about the second shaft member, and a marking is provided for positioning the first and second gears relative to each other.

It is an object of the present invention to provide an electrical connector device of the loose connection wire type for use in an electrical system requiring electrical connection between relatively rotatable members, such as an electrical system mounted in the steering wheel assembly of a motor vehicle, the electrical connector device being capable of easy and accurate relative positioning between the rotatable members for smoother assembly operation for the electrical connector device.

The above and further objects, features, and advantages of the present invention will become more apparent from the following description when read in conjunction with the accompanying drawings wherein certain preferred embodiments are shown by way of illustrative example.

BRIEF DESCRIPTION OF THE DRAWINGS

FIG. 2 is a fragmentary axial cross-sectional view of the electrical connector device shown in FIG. 1.

FIG. 3 is a plan view of the electrical connector device illustrated in FIG. 1.

FIG. 4 is a bottom view of the electrical connector device illustrated in FIG. 1.

FIG. 5 is a transverse cross-sectional view of an electrical conductor employed in the electrical connector device of the present invention.

FIG. 6 is a schematic plan view of a lock mechanism of the electrical connector device of FIG. 1.

FIG. 7 is an axial cross-sectional view of an electrical connector device according to a second embodiment of the present invention.

FIG. 8 is a plan view of the electrical connector device shown in FIG. 7.

FIG. 9 is a bottom view of the electrical connector device shown in FIG. 7.

DETAILED DESCRIPTION OF PREFERRED EMBODIMENTS

Figure 1:
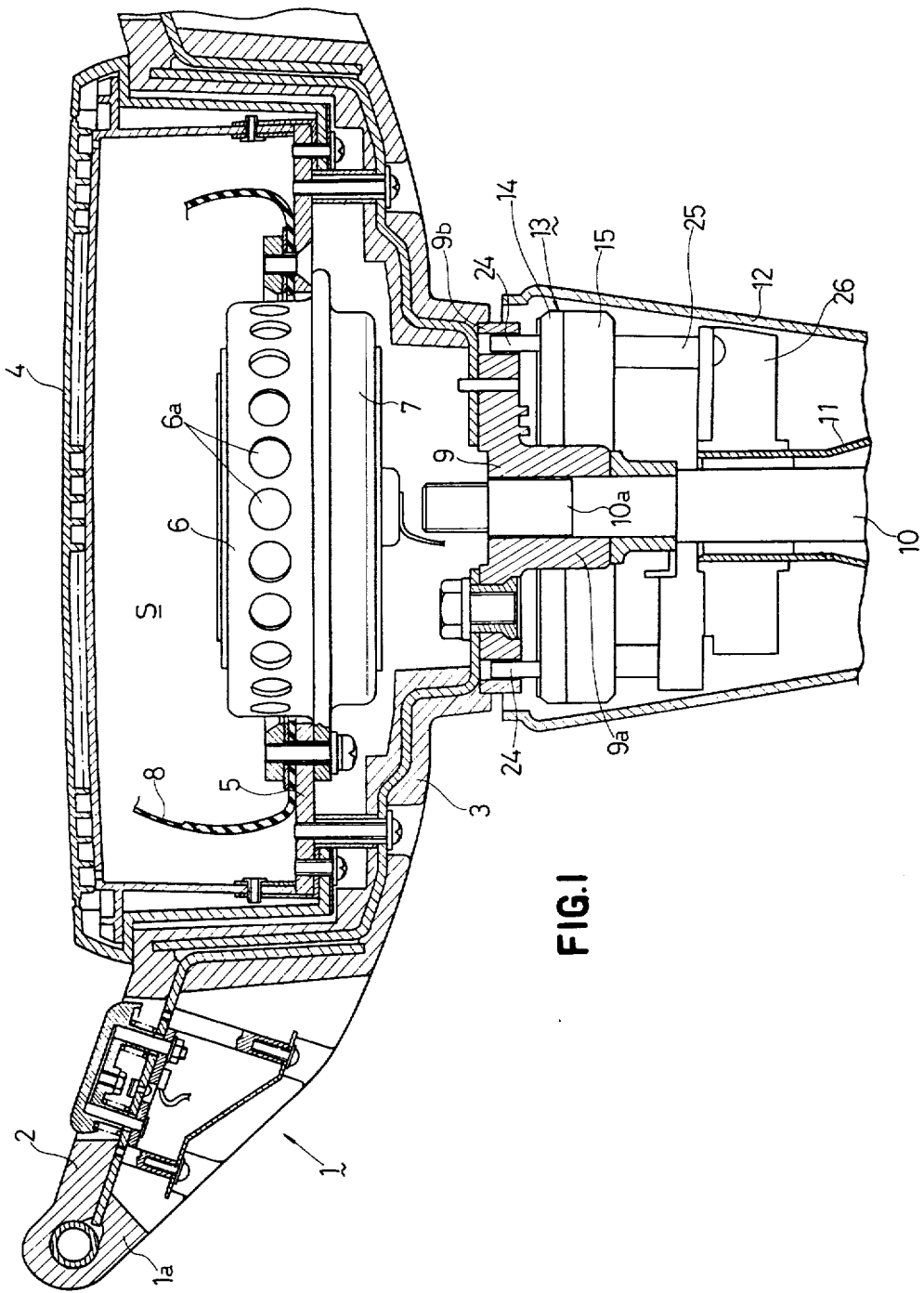
FIG. 1 is a fragmentary longitudinal cross-sectional view of a steering wheel assembly having an air bag system incorporating therein an electrical connector device according to a first embodiment of the present invention.

The electrical connector device in accordance with the first embodiment of the present invention will now be described with reference to FIGS. 1 through 6.

A steering wheel 1 of a motor vehicle comprises an annular wheel member 1a connected by a plurality of radial spokes 2 to a central concave member 3 located radially inwardly of the annular wheel member 1a, the central concave member 3 being covered with a pad 4. A gas generator 6 having nozzles 6a is mounted centrally on a base 5 which is supported on a bottom of the central concave member 3 and disposed in a space S in the latter. The gas generator 6 may comprise a gas cylinder (not shown) which is releasable to discharge or produce a pressurized gas by an actuator mechanism (not shown) which can be operated by an actuator 7 disposed below the gas generator 6 in response to an electrical signal supplied to actuator 7 from a collision sensor (not shown) mounted on the motor vehicle. An air bag 8 in a collapsed condition is housed in the space S above the gas generator 6. Upon introduction of the gas into the air bag 8, the latter is inflated, tears open the pad 4, and expands in front of the driver of the motor vehicle to dampen the shock or impact to which the driver would otherwise be subjected in a traffic accident involving the motor vehicle.

The steering wheel also includes at the bottom of the central concave member 3 a boss 9 which centrally receives therein an upper distal end 10a of a steering shaft 10. Rotational steering movement of the steering wheel 1 can thus be transmitted to the steering shaft 10 for steering the motor vehicle. The steering shaft 10 is surrounded by a steering column 11 which is fixed with respect to a frame of the motor vehicle. A cover 12 extends so as to surround the steering shaft 10 and terminates just short of the central member 3 of the steering wheel 1.

FIGS. 2 through 4 show an electrical connector device 13 comprising a casing assembly which includes an upper casing 14 and a lower casing 15 which are fabricated of an insulating material such as synthetic resin, and a lock mechanism 16 mounted in a lower portion of the casing, as illustrated in FIG. 2. The upper and lower casings 14, 15 jointly define an annular space 17 in the casing, which extends axially and radially of the casing. An electrical conductor 18 is coiled in convolutions within the annular space 17 and can be wound and unwound therein in opposite directions. The electrical conductor 18 is in the form of a tape, for example, as shown in FIG. 5, which comprises a flexible insulator 18a formed, for example, of synthetic resin, and a pair of parallel flat copper strips 18b, 18b spaced laterally from each other and embedded in the flexible insulator 18a. The electrical conductor 18 may alternatively be circular in cross section. The electrical connector 18 has one end thereof connected to terminals 19, 19 (FIG. 3) attached to the upper casing 14 and having ends thereof disposed on an upper surface of the upper casing 14 at an outer peripheral portion thereof; and the other end of electrical connector 18 is connected to terminals 20, 20 (FIG. 4) attached to the lower casing 15 and having ends thereof disposed on a lower surface of the lower casing 15 at an outer peripheral portion thereof.

As illustrated in FIGS. 2 and 4, the lock mechanism 16 comprises a larger-diameter gear 21 and a smaller-diameter gear 22, both of the gears 21, 22 being placed in a recess defined in the lower surface of the lower casing 15. The larger-diameter gear 21 is fitted over a downwardly projecting cylindrical extension 14a of the upper casing 14 for angular movement therewith. The smaller-diameter gear 22 is mounted by a snap ring 23 on a shaft 15a integrally projecting downwardly from the lower casing 15, and is held in meshing engagement with the larger-diameter gear 21 for rotation about the shaft 15a. When the upper and lower casings 14, 15 rotate relative to each other, the electrical conductor 18 with either end affixed to the upper and lower casings 14, 15 is caused to be wound or unwound within the space 17, allowing the upper and lower casings 14, 15 to relatively rotate through several revolutions. As described in greater detail hereinbelow, the gears 21, 22 of the lock mechanism 16 are particularly designed to limit winding or unwinding rotation of the electrical conductor 18 from its neutral position within a predetermined angle.

The electrical connector device 13 as thus constructed is disposed substantially immediately below the central member 3 of the steering wheel 1. More specifically, the upper casing 14 has an inner cylindrical portion 14b contiguous with the downward extension 14a and fitted over a cylindrical portion 9a of the boss 9. The upper casing 14 also has rods 24, 24 projecting upwardly from the upper surface thereof into a flange 9b extending radially outwardly from an upper end of the boss 9. The lower casing 15 has rods 25 projecting downwardly from the lower surface of the lower casing 15 in the axial direction thereof and secured to a bracket 26 mounted on and extending around an upper end of the steering column 11, as shown in FIG. 1. In this manner, the upper casing 14 is connected for rotation with the steering wheel 1, whereas the lower casing 15 is fixedly supported by the steering column 11. The terminals 19, 19 on the upper casing 14 are electrically connected by lead wires to the actuator 7, and the terminals 20, 20 on the lower casing 15 are electrically connected by lead wires to the collision sensor. The actuator 7 and the collision sensor are thus electrically connected with each other at all times, while at the same time the steering wheel 1 is permitted to rotate in the clockwise or counterclockwise directions.

As shown in FIG. 2, the electrical connector device 13 includes a slip ring 27 and a brush 28 which are disposed in a space defined between the upper and lower casings 14, 15 along their outer peripheries and which are affixed to the lower and upper casings 15, 14, respectively. The slip ring 27 and the brush 28 are held in sliding contact with each other to complete an electrical circuit for a horn of the vehicle, as well as other electrical systems.

The operation of the lock mechanism 16 will now be described hereinbelow.

In FIG. 6, the smaller-diameter gear 22 is in the form of a spur gear having seventeen gear teeth, an adjacent pair of which are united by filling the space therebetween so as to form a single enlarged gear tooth X. The larger-diameter gear 21 is in the form of a spur gear having forty-eight gear teeth, some of which are removed at intervals to define wider intertooth spaces or grooves Y which are receptive of only the tooth X on the smaller-diameter gear 22.

The larger-diameter gear 21 in actuality rotates with the upper casing 14 on which the gear 21 is mounted, and the smaller-diameter gear 22 rotates in meshing engagement with the gear 21 at a fixed position. For convenience of description, however, it will be assumed hereinbelow with reference to FIG. 6 that the larger-diameter gear 21 is fixed and the smaller-diameter gear 22 revolves around the larger-diameter gear 21 in meshing engagement therewith. One complete revolution of the smaller-diameter gear 22 around the larger-diameter gear 21 means that the larger-diameter gear 21 actually makes one complete revolution. In the position A, the tooth X on the smaller-diameter gear 22 abuts against one tooth 21a of the teeth on the larger-diameter gear 21, which are assumed to be spaced at substantially equal pitches, thus locking the gears 21, 22 against rotation relative to each other. With the gear tooth 21a serving as a reference or starting tooth for description purposes, all of the teeth on the larger-diameter gear 21 are consecutively numbered counterclockwise as first, second, third, etc., until the final tooth behind the tooth 21a is numbered. Then the teeth are numbered again, starting with the tooth 21a, counterclockwise, and employing consecutive ordinal numbers. The grooves Y on the larger-diameter gear 21 are located such that, as the smaller-diameter gear 22 revolves counterclockwise around the larger-diameter gear 21 in the direction of the arrow, those teeth on the larger-diameter gear 21 which are numbered with ordinal numbers corresponding to multiples of seventeen (the number of teeth on the smaller-diameter gear 22), i.e., 17th, 34th, 51st, 68th, etc., are removed or cut away to define a suitable number of such grooves Y. With this arrangement, the smaller-diameter gear 22 is allowed to revolve around the larger-diameter gear 21 until the former is locked against rotation after it has made one revolution from the tooth position corresponding to the final multiple of seventeen employed.

As an example, where the larger-diameter gear 21 has nine grooves Y thereon, the smaller-diameter gear 22 is permitted to revolve around the larger-diameter gear 21 through three and one-half revolutions, which correspond to an angle of 1,260 degrees, before the smaller-diameter gear 22 is locked against further rotation on the larger-diameter gear 21, as is evident from the calculation: 17×(9+1)−2=168 and 168÷48=3.5. The reference numerals ①, ②, and ③ denote the numbers of revolutions of the smaller-diameter gear 22 upon meshing engagement of the tooth X in the grooves Y. Thus, the gear tooth X on the smaller-diameter gear 22 enters the grooves Y numbered with ② while the smaller-diameter gear 22 is making the second revolution around the larger-diameter gear 21.

By employing the lock mechanism 16, the electrical conductor 18 can be coiled in the electrical connector device 13 during assembly operation thereof so that the upper casing 14 can be easily positioned in a neutral location with high precision. For example, assuming that the electrical connector device 13 is allowed by the lock mechanism 16 to rotate through three and one-half revolutions (1,260 degrees), the neutral position of the electrical connector device 13 can be found when the upper casing 14 revolves from the starting locked position A through half of the allowable range of rotation, i.e., 1.75 revolutions (630 degrees). The upper casing 14 can therefore be brought to its neutral position with utmost ease and precision, so that the connector device 13 can be assembled in a simple and efficient procedure. Further, the upper casing 14 can be locked at its limits of rotation by the lock mechanism 16, an arrangement which prevents the electrical conductor 18 from being subjected to undue tension. The range of allowable rotation of the upper casing 14 can be selected as desired by changing the numbers of teeth on the gears 21, 22 and the number of grooves Y on the gear 21.

FIGS. 7 through 9 illustrate an electrical connector device in accordance with a second embodiment of the present invention. In FIG. 7, an electrical connector device 113 comprises a movable upper casing 114 and a fixed lower casing 115. The lower casing 115 includes a central through hole 115a defined by a cylindrical portion 115b fitted over a downwardly extending cylindrical portion of a boss (not shown), a substantially disc-shaped body 115c extending radially outwardly from a lower end of the cylindrical portion 115b, an annular step or shoulder 115d disposed around the body 115c and elevated in the direction of the axis of the electrical connector device 113, and an outer annular wall 115e extending around the annular step 115d. The upper casing 114 includes a substantially disc-shaped body 114a having an inner annular flange 114b held in engagement with a small-diameter step 115f on an upper outer peripheral portion of the cylindrical portion 115b of the lower casing 115. The upper and lower casings 114, 115 are rotatable relative to each other. The upper casing 114 has an inner annular wall 114c extending downwardly and along an outer peripheral portion thereof, the annular wall 114c having the distal end 114d thereof disposed radially inwardly of the annular step 115d of the lower casing 115. The lower casing 114 also has two steps 114e, 114f disposed radially outwardly of the inner wall 114c and lying at different elevations in the direction of the axis of the electrical connector device 113. The inner step 114e is axially spaced from and confronts the step 115d of the lower casing 115, and the outer step 114f is held in sliding contact with the axial end of the outer annular wall 115e.

The upper and lower casings 114, 115 jointly define therebetween an annular space 117 which extends axially and radially and which is positioned radially between the cylindrical portion 115b and the inner wall 114c, and axially between the upper and lower bodies 114a, 115c. The space 117 houses therein an electrical conductor 118 coiled in convolutions and rotatable in winding and unwinding directions through several revolutions from a neutral position thereof. The electrical conductor 118 has one end thereof connected to terminals 119 (FIG. 8) mounted on the upper casing 114 and having ends thereof disposed on an upper surface of the upper casing 114; and the other end of conductor 118 is connected to terminals 120 (FIG. 9) mounted on the lower casing 114 and having ends thereof disposed on a lower surface of the lower casing 115. The terminals 119, 120 are electrically connected to an actuator mounted on a steering wheel and a collision sensor mounted on a vehicle frame, respectively, the actuator and the collision sensor being part of an air bag system installed in a motor vehicle.

When the upper and lower casings 114, 115 are caused to rotate relative to each other, the electrical conductor 118 with its ends connected to the upper and lower casings 114, 115 is progressively wound or unwound to allow relative rotation of the casings 114, 115 through several revolutions. The steps 114e, 115d jointly define therebetween a small annular space 121 in which there are accommodated a slip ring 122 and a brush 123 which are affixed to the lower and upper casings 115, 114, respectively, and complete an electric circuit for a vehicle horn and other electrical systems.

The electrical connector device 113 can be installed by fitting the cylindrical portion 115b over the cylindrical portion of the boss immediately below a central member of the steering wheel, and connecting the upper casing 114 to the boss with rods 125 which project from the upper surface of the upper casing 114 being connected to a flange extending radially outwardly from an upper end of the cylindrical portion of the boss. The lower casing 115 has rods 126 projecting axially downwardly from the lower surface thereof and fixed to a flange secured to an upper end of a steering column (not shown). The upper casing 114 is therefore rotatable with the steering wheel, and the lower casing 115 is fixedly supported by the steering column.

The upper casing 114 has a central annular recess 114g which surrounds a small-diameter portion 115g at an upper portion of the step 115f of the cylindrical portion 115a of the lower casing 115. An annular gear 128 is slidably disposed in the annular recess 114g and is fastened to the small-diameter portion 115g against axial and rotational movement with respect thereto, the annular gear 128 being in the form of an external gear with its internal periphery fitted around the small-diameter portion 115g. The gear 128 is rotatable with the lower casing 115. Because gear 128 is fixed to the small-diameter portion 115g and received in the recess 114g, it prevents the upper casing 114 from moving axially with respect to the lower casing 115. As shown in FIG. 8, the upper casing 114 also has a circular recess 114h opening into and partially overlapping the central annular recess 114g. A pinion 129 is journaled on a stud or shaft 114i disposed centrally of the circular recess 114h and integrally projecting upwardly from the bottom of the latter, the pinion 129 being held in meshing engagement with the annular gear 128.

The electrical connector device 113 is assembled with the electrical conductor 118 housed in the space 117 as shown in FIG. 7. After the upper casing 114 has been brought into a neutral position, the pinion 129 and the gear 128 are marked with an indication or mark 130 extending across their meshing engagement area along a line passing through the axes of the pinion 129 and the gear 128. The marking line 130, with the two portions thereof aligned, serves as a reference indication showing that the upper casing 114 is in the neutral position.

When the upper and lower casings 114, 115 rotate relative to each other, the pinion 129 rotates about its own axis while at the same time revolving around the gear 128 because the gear 128 is affixed to the lower casing 115 and the pinion 129 is rotatably mounted on the upper casing 114. The number of teeth of the pinion 129 is selected to be ten, whereas the number of teeth of the gear 128 is selected to be thirty-one, such that the portions of marking 130 will never be aligned while the upper and lower casings 114, 115 mutually make several revolutions in either direction. Steering wheels on motor vehicles normally rotate clockwise or counterclockwise through one and one-half revolutions. With such range of rotation of steering wheels, the electrical conductor 118 in the electrical connector device 113 is allowed to rotate in a winding or unwinding direction through three to four revolutions. The number of teeth as specified above are such that no marking alignment will take place while the upper and lower casings 114, 115 rotate relative to each other through more than twice as many as three to four revolutions, and the marking line portions will not even get close to each other in such range of revolutions.

The upper and lower casings 114, 115 are likely to rotate accidentally relative to each other during shipment and storage from the time when the electrical connector device 113 is assembled with the parts set in the neutral position to the time when the electrical connector device 113 is installed between a steering wheel and an associated steering column. When the electrical connector device 113 with the electrical conductor 118 excessively coiled for additional convolutions is mounted between the steering wheel and the steering column, the electrical conductor 118 is placed under undue tension and tends to be damaged. To avoid this problem, the upper and lower casings 114, 115 are rotated before installation of the conductor, to obtain the aligned marking 130 on the pinion 129 and the gear 128. Therefore, the electrical connector device 113 can be installed in position with the electrical conductor 118 neutrally positioned. The electrical conductor 118 as thus assembled can be wound or unwound smoothly in response to steering motion of the steering wheel without being subjected to undue loads or stresses.

While in the foregoing embodiment the external annular gear is supported on the lower casing and the pinion is rotatably mounted on the upper casing, the pinion and the gear may alternatively be disposed on the lower and upper casings, respectively, for the same operation.

While the electrical connector devices according to the above-described embodiments of the invention have been described and shown as incorporated in air bag systems in steering wheels of motor vehicles, it will be understood that the connector devices may also be employed in other applications wherein relatively rotatable members require electrical interconnection.

Although certain preferred embodiments of the present invention have been shown and described in detail hereinabove, it will be understood that various changes and modifications may be made therein without departing from the scope of the appended claims.

I claim:
1. An electrical connector device comprising:
 a first insulator having at least one first terminal affixed thereto;
 a first shaft member projecting from said first insulator;
 a second insulator rotatably fitted over said first shaft member and having at least one second terminal affixed thereto;

a second shaft member secured to said second insulator;

a flexible conductor in the form of a wire having one end thereof connected to said first terminal and the other end thereof connected to said second terminal, said conductor being wound around said first shaft member; and restriction means for limiting relative rotation between said first and second insulators within a predetermined angle, said restriction means including a first gear of a relatively large diameter fitted over said first shaft member for angular movement therewith and a second gear of a relatively small diameter held in meshing engagement with said first gear for angular movement about said second shaft member, one of said first and second gears including an enlarged gear tooth.

2. An electrical connector device according to claim 1, wherein:

said first gear comprises a spur gear having at least one first intertooth groove of a relatively large first pitch and a plurality of second intertooth grooves of a relatively small second pitch; and said second gear comprises a spur gear having said enlarged gear tooth provided thereon, said enlarged gear tooth comprising at least one first tooth of said first pitch, and said second spur gear also having at least one second tooth of said second pitch.

3. An electrical connector device according to claim 2, wherein:

said first pitch is substantially three times as large as said second pitch.

4. An electrical connector device according to claim 3, wherein:

said first gear has a plurality of said first intertooth grooves; and said second gear has one said first tooth.

5. An electrical connector device comprising:

a first insulator having at least one first terminal affixed thereto;

a first shaft member projecting from said first insulator;

a second insulator rotatably fitted over said first shaft member and having at least one second terminal affixed thereto;

a second shaft member secured to said second insulator;

a flexible conductor in the form of a wire having one end thereof connected to said first terminal and the other end thereof connected to said second terminal, said conductor being wound around said first shaft member;

a first gear of a relatively large diameter fitted over said first shaft member for angular movement therewith;

a second gear of a relatively small diameter held in meshing engagement with said first gear for angular movement about said second shaft member; and a marking for positioning said first and second gears relative to each other.

6. An electrical connector device according to claim 5, wherein:

said marking comprises a first line portion marked on said first gear and a second line portion marked on said second gear; and said first and second line portions are alignable with each other when said first and second gears are placed in a predetermined relative position.

7. An electrical connector device according to claim 6, wherein:

the number of teeth on said first gear is not a multiple of the number of teeth on said second gear.

* * * * *